April 17, 1951 R. S. ARCHER 2,549,560
SHEET STOCK SUPPORT FOR SHEARING MACHINES
Filed May 7, 1949
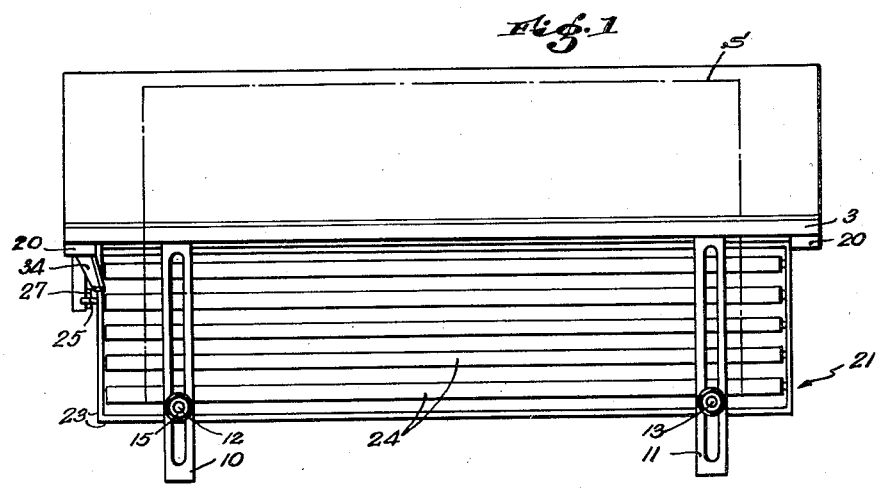
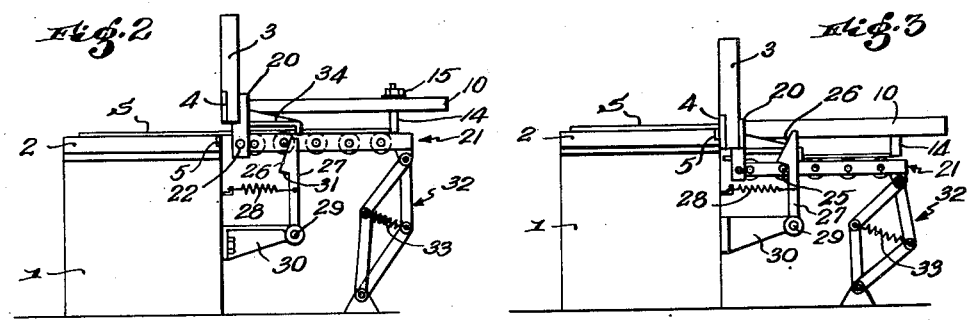
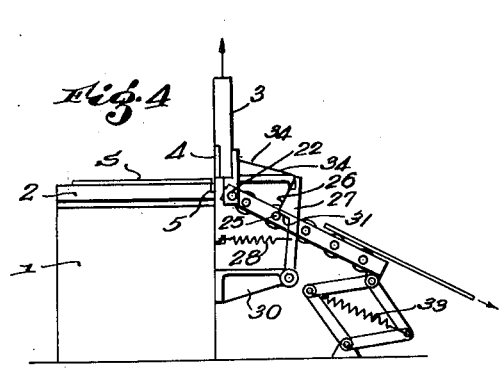
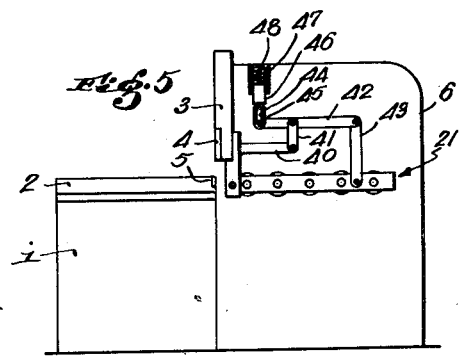
Inventor
Robert S. Archer
by Dike, Calver & Porter
Attys.

Patented Apr. 17, 1951

2,549,560

UNITED STATES PATENT OFFICE 2,549,560

SHEET STOCK SUPPORT FOR SHEARING MACHINES

Robert S. Archer, Raynham Center, Mass.

Application May 7, 1949, Serial No. 92,010

3 Claims. (Cl. 164—48)

My present invention relates to a support for the measured ends of sheet stock as it is sheared, and particularly to a self-dumping or self-clearing support or table.

When cutting sheet metal, it is necessary to pass the sheet between the shears and bring it to rest against an adjustable stop which measures off the length to be cut. These stops or gauges are usually clamped to the machine table in front of the blades, and are sometimes held on lateral supports at the rear of the machine. Cutting operations on material which is too flexible to be self-supporting are usually performed by pulling the material through under the upper cutting blade from the rear of the machine until it reaches a stop in front of the operator. After the material is cut, the severed portion is lifted off and placed in a truck or in a box. This is time-consuming. A faster way of performing the operation is to push the material through from the front, and let the severed portion fall due to gravity after it is cut. Thin flexible stock will not be properly measured, however, as it buckles and hangs down in back forming a curved line to the gauge. So far as I am aware, no one has ever devised a satisfactory support to hold the sheet so that it can be properly gauged. The nearest approach is an electromagnetic device above the sheet which will hold the sheet up for gauging and still allow it to go down with the knife, but this is very expensive, and even within its limited field of application, has not proved entirely successful.

The objects of the invention are to provide an adequate support for flexible sheets which will allow them to be fed easily and measured accurately; which will allow the cut sheet to be carried down by the knife, and which will automatically dispose of the cut sheet.

In accordance with my invention, I provide a support which is pivotally secured to the knife bar itself, and therefore lowered with it bodily as the material is cut. Other mechanism causes the support to tilt at the proper time to deposit the severed portion.

In the accompanying drawings,

Fig. 1 is a top plan view of a shearing machine showing an embodiment of the invention;

Figs. 2, 3 and 4 are end views thereof illustrating various operative positions, and Fig. 5 is an end view of a modification.

As shown in the drawings, a shearing machine comprises a base 1, front table 2, knife bar or support 3 and knife blade 4. The element 5 is a stationary shearing element affixed to the table. Usually the machine will be provided with upright side frame plates 6, one of which is here shown in Fig. 5, where it serves as a support for mechanism pertaining to the invention.

Two slotted arms 10 and 11 are secured to the knife bar 3 and extend rearwardly of the machine. Carried by these arms are stops 12 and 13, each of which will generally have a contact pin 14 and a nut 15 (Fig. 2), which can be tightened to hold the pin in a given position anywhere intermediate the ends of the arms.

Also secured to knife bar 3 are a pair of brackets 20 to which a cut stock supporting and delivery table 21 is pivotally secured as indicated at 22. The table 21 preferably comprises a frame 23 and a number of rolls 24 carried by and journalled in the frame. The top of the table 21 is on a level with the top of front table 2 when the knife bar 3 is in the raised position shown in Fig. 2. At the same time, the rear of the table 21 is abutting the pin 14, and a sheet of stock S can be moved under the knife along the rolls 24 until it reaches the contact pins.

After the stock is in place, the knife is lowered in a cutting stroke, and downward movement of the bar 3 carries down the brackets 20, the arms 10 and 11 and the stops 12 and 13 which cause the table 21 to move downward bodily while maintaining a horizontal position. The severed part of the sheet is allowed to move downwardly also. As the bar 3 moves downward, a pin 25 on the side of the table rides over a cam surface 26 on a catch 27 and moves it to the right in Fig. 2, increasing the tension of a spring 28. The catch 27 is pivoted at 29 on a bracket 30 secured to the base 1 of the machine. At the bottom of the cutting stroke, the pin slips into the notch 31 of the catch, and the spring 28 pulls the catch to the left as viewed in Fig. 3. Thereupon, upward movement of the knife bar pulls upwardly on the brackets 20 and the inner or left hand end of table 21, while the table is caused to pivot about the pin 25 which is caught in the latch. The rearward end of the table is depressed as the pivoting continues, compressing a double toggle 32 having knees connected by a spring 33. Then as the knife bar nearly reaches the upward limits of its travel, the pin 25 is drawn out of the notch 31, the table is released, so that it again pivots at the brackets 20, and the spring toggle 32 returns the outer end of the table to horizontal position, at which time further upward movement is prevented by a stop 34. As shown in Fig. 4, the stock is deposited or dumped when the table is tipped.

In the preferred structure described above, the tilting takes place on the upward movement of the knife. If it is desired to have the stock removed earlier, the modified device shown in Fig. 5 may be employed. The table 21 is pivotally attached to brackets 20 as before, and an arm 40 fixed to and extending rearwardly from the bar 3 is pivotally connected to link 41 which is pivotally connected intermediate the ends of link 42 which is connected to table 21 by a link 43. The inner end of link 42 has a vertical slot 44 through which there extends a pin 45 on an adjacent part of the side frame plate 6. Bearing on the slotted end of the link 42 is a sliding block 46 held in guides 47 on the plate 6 and bearing against a compression spring 48 held in said guides. The table 21 abuts against gauge stops (not shown for the sake of clarity) mounted rigidly on the shearing bar 3 similar to those 12 and 13 on the arms 10 and 11 in Figs. 1–4. When the bar 3 is depressed, the table 21 is carried downward by the brackets 20 and the gauge stops and the link 42 is momentarily carried downward horizontally. When the limit of the slot 44 is reached, the link 42 is pivoted about link 41, causing the outer end of the table to be lowered with continued downward movement of the knife. At the end of the stroke, as the table moves upwardly, the spring 48 helps return the table to horizontal position against the stops and holds it level during positioning of the stock and initially at the beginning of the next knife stroke.

I claim:

1. In a shearing machine and in combination, said shearing machine having a vertically reciprocating stock shearing bar; stop means forming a gauge rigidly attached to and moving with said shearing bar at the rear of the machine, a cut stock supporting and delivery table pivoted at one end to said shearing bar, yielding means supporting said table in horizontal position against said stop means during part of the movement of said shearing bar, and tilting means momentarily detaining said table against said yielding means and moving it out of horizontal about its pivot to discharge stock during another part of the shearing bar movement.

2. The combination as set forth in claim 1 in which said tilting means comprising a pin and a spring operated yieldable latch engaging said pin during part of the upward movement of said shearing bar.

3. The combination as set forth in claim 1 in which said tilting means comprising a slotted link connecting said yielding means and said table and a pin in said slot limiting the movement of the yielding means during the cutting stroke of the shearing bar thereby tilting the table during further cutting movement.

ROBERT S. ARCHER.

REFERENCES CITED

The following references are of record in the file of this patent:

UNITED STATES PATENTS

| Number | Name | Date |
| --- | --- | --- |
| 840,398 | Taylor | Jan. 1, 1907 |
| 2,052,615 | Foellmer | Sept. 1, 1936 |
| 2,204,405 | Dunlap | June 11, 1940 |